(12) United States Patent
Stoutamire et al.

(10) Patent No.: US 11,788,834 B2
(45) Date of Patent: Oct. 17, 2023

(54) METHOD FOR MEASURING SURFACE CHARACTERISTICS IN OPTICALLY DISTORTING MEDIA

(71) Applicant: Electric Power Research Institute, Inc., Palo Alto, CA (US)

(72) Inventors: David Stoutamire, Menlo Park, CA (US); Dennis Hussey, Redwood City, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 183 days.

(21) Appl. No.: 17/284,470

(22) PCT Filed: Oct. 12, 2018

(86) PCT No.: PCT/US2018/055548
§ 371 (c)(1),
(2) Date: Apr. 11, 2021

(87) PCT Pub. No.: WO2020/076336
PCT Pub. Date: Apr. 16, 2020

(65) Prior Publication Data
US 2021/0389124 A1 Dec. 16, 2021

(51) Int. Cl.
*G01B 11/25* (2006.01)
*G06T 7/521* (2017.01)

(52) U.S. Cl.
CPC .......... *G01B 11/2527* (2013.01); *G06T 7/521* (2017.01); *G06T 2207/30108* (2013.01)

(58) Field of Classification Search
CPC ................................................ G01B 11/2527
See application file for complete search history.

(56) References Cited

U.S. PATENT DOCUMENTS

| 3,907,438 A * | 9/1975 | Holeman | G01B 9/02 |
| | | | 356/601 |
| 2006/0072122 A1* | 4/2006 | Hu | G06T 7/521 |
| | | | 356/603 |

(Continued)

FOREIGN PATENT DOCUMENTS

| JP | H05-093616 A | 4/1993 |
| JP | 2000-082654 A | 3/2000 |

OTHER PUBLICATIONS

International Search Report for Application No. PCT/US2018/055548 dated Feb. 26, 2019.

(Continued)

*Primary Examiner* — Xiaolan Xu
(74) *Attorney, Agent, or Firm* — Curatolo Sidoti & Trillis Co., LPA; Salvatore A. Sidoti; Floyd Trillis, III

(57) ABSTRACT

Provided is a method for measuring surface characteristics of at least a portion of an object, including providing a light source; generating a first interference pattern on the at least a portion of the object; capturing an image of the first interference pattern; shifting the phase of the light source to generate a second interference pattern; capturing an image of the second interference pattern; filtering distortion from the interference patterns; extracting a wrapped phase of the at least a portion of the object based on the images; unwrapping the wrapped phase of the at least a portion of the object to generate an unwrapped phase; identifying a computed depth map distance to the at least a portion of the object; and fitting an ideal part to the computed depth map of the at least a portion of the object to measure the surface characteristics.

21 Claims, 4 Drawing Sheets

(56) References Cited

U.S. PATENT DOCUMENTS

| | | | |
|---|---|---|---|
| 2009/0238470 A1 | 9/2009 | Ives et al. | |
| 2009/0322859 A1* | 12/2009 | Shelton | H04N 13/207 348/46 |
| 2014/0354681 A1* | 12/2014 | Xiong | G06T 7/521 345/619 |
| 2015/0271466 A1* | 9/2015 | Yamazaki | G06V 10/60 348/46 |
| 2020/0258246 A1* | 8/2020 | Ono | G01B 11/2527 |

OTHER PUBLICATIONS

Written Opinion of the International Searching Authority for Application No. PCT/US2018/055548 dated Feb. 26, 2019.

\* cited by examiner

METHOD FOR MEASURING SURFACE CHARACTERISTICS IN OPTICALLY DISTORTING MEDIA

CROSS REFERENCE TO RELATED APPLICATIONS

This application is a national stage application of International Application No. PCT/US2018/055548, filed 12 Oct. 2018, which is incorporated herein by reference in its entirety.

The present embodiments are directed to a method for measuring surface characteristics in optically distorting media.

Industrial surfaces may corrode, accumulate unwanted material, deform, and/or otherwise change during use. These changes may challenge cost, efficiency and safety, for example. Measurement of surface characteristics, such as thickness, curvature, roughness, cracks, etc., may allow tracking, analysis and/or mitigation.

Taking such measurements may be challenging in adverse environments. For example, corrosion product deposits on nuclear reactor fuel (often referred to as "crud") can limit power and/or lead to fuel cladding corrosion. Knowing the thickness and morphology (e.g., porosity and/or composition) of the crud may help estimate the risk of these events and guide operational choices.

Crud may be particularly hard to measure because of the harsh (underwater, irradiated) environment and consequences of disturbing the potentially fragile surface. This may prevent conventional inspection techniques such a stylus profilometry. Eddy current studies may be performed occasionally but are expensive and/or complicated by fuel cladding oxides.

Conventional optical techniques may suffer from uncontrolled changes in index of refraction due to environmental temperature gradients. For example, underwater fuel rods with crud may produce substantial heat, which results in convection, which may cause image distortion. Additionally, water absorbs wavelengths outside of the visible range. Furthermore, surface reflectivity and scattering may vary unpredictably across the surface being analyzed.

Measuring the deposition of crud and/or oxide buildup on objects, such as nuclear fuel rods, involves measuring variable thicknesses of from about 10 to about 100 microns (about 0.3 to about 4 mils). Crud and metallic oxides commonly found on objects may have variable density, such as about 4.0 g/cm$^3$ for nuclear fuel rods. Further, this buildup may contain chimneys of about 0.0018 mm in diameter and porosity that makes up from about 40% to about 60% of the volume of the buildup.

Further, measuring crud and/or oxide deposition on nuclear fuel rods in particular may involve taking measurements on used fuel, which is usually stored in a spent fuel pool about meters under water and at pressures of about 2 atm. Temperature in the pool varies, with an average temperature of about 25° C. to about 30° C. for the pool as a whole, but with the water getting significantly warmer near the fuel. This temperature gradient may cause significant flow due to convection, which may even result in localized turbulent flow. Safety and practicality may require avoiding contact with the fuel and minimizing expose to ionizing radiation in certain circumstances.

There are many optical techniques for surface measurement of objects described in the academic literature and applied in industry. These techniques include interferometry, conoscopy, fringe profilometry, polariscopy, structured-light and stereo vision, speckle correlation, stereophotogrammetry, photometric stereo, depth from focus, deconvolution microscopy, photometry, 3d scanning (including time of flight and triangulation), scattering and confocal techniques.

All optical techniques present fundamental tradeoffs between working distance, depth of field, and lateral, axial, and temporal resolution. These arise from fundamental physical limits, particularly diffraction. For example, microscopy at a distance reduces depth-of-field, and scanning techniques (whether conoscopic, low-coherence, triangulation, or depth from focus) trade spatial resolution for temporal resolution, becoming sensitive to target movement during the scan. The difficulty is in achieving both adequate simultaneous spatial and temporal resolution of a moving target while at a distance in a distorting medium.

Astronomical techniques for reducing distortion due to atmospheric turbulence have been attempted, including lucky imaging, speckle imaging, and adaptive optics, but these are not optimized for close objects.

What is needed is a method for measuring surface characteristics of at least a portion of an object in an underwater environment which may involve variable and changing indexes of refraction, and wherein the objects may be relatively close, as compared to circumstances where astronomical techniques may be optimal. Comparing the deviation of the data to an ideal model of the target makes the data operationally useful. For example, the difference between the fit radius and the original fuel rod specification is a direct estimation of combined oxide and crud thickness, which is of immediate interest to nuclear plant operations. The present embodiments allow measurement of surfaces at greater spatial or temporal resolution than otherwise achievable in the field due to noise and distortion from variations of the index of refraction due to thermal convection.

Embodiments of the subject matter are disclosed with reference to the accompanying drawings and are for illustrative purposes only. The subject matter is not limited in its application to the details of construction or the arrangement of the components illustrated in the drawings. Like reference numerals are used to indicate like components, unless otherwise indicated.

Figure 4:
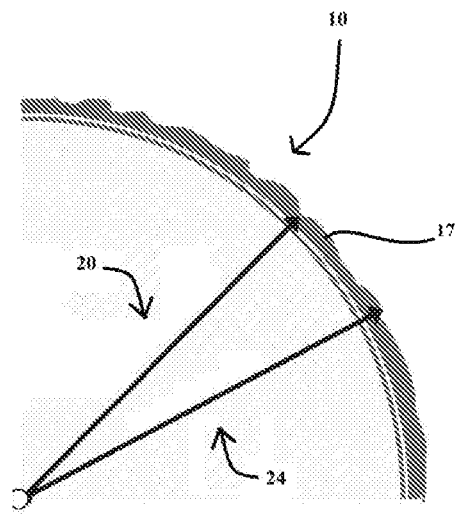

FIG. 4 schematic, cross-sectional view showing that deposition of crud on an object changes thickness of the object that may result in roughness.

Figure 5:
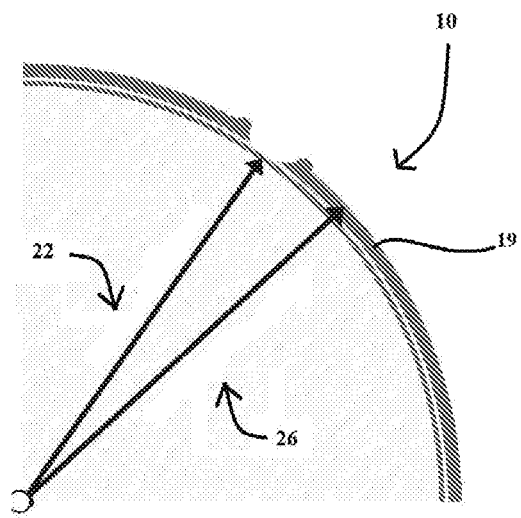

FIG. 5 schematic, cross-sectional view showing that deposition of crud on an object changes thickness of the object and may reveal defects.

Figure 6:
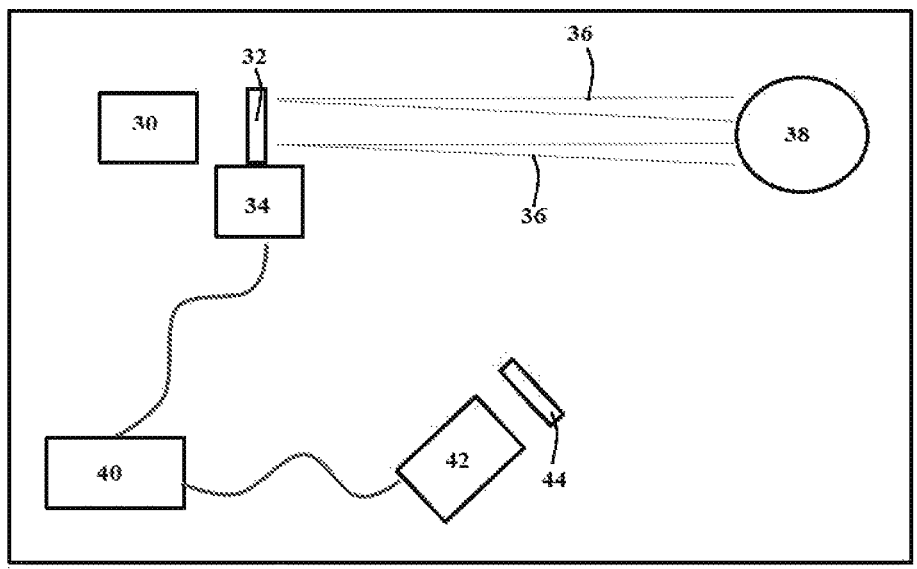

FIG. 6 is a top view of an illustrative embodiment of the present subject matter.

Figure 7:
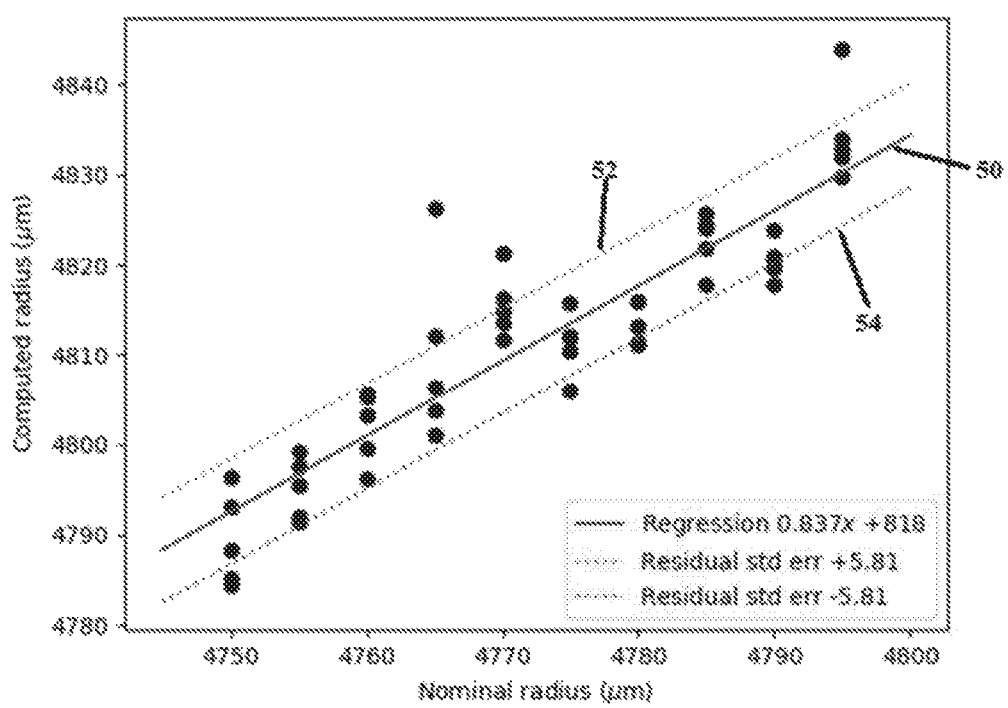

FIG. 7 is a graph showing the computed radius vs. nominal radius for ten pins measured according to an embodiment.

The present embodiments are directed to a method for measuring surface characteristics of at least a portion of an object; comprising providing at least one light source; directing light from the light source to generate a first interference pattern on the at least a portion of the object; capturing at least one first image of the first interference pattern; shifting the phase of the at least one light source to generate a second interference pattern; capturing at least one second image of the second interference pattern; filtering distortion from the first interference pattern and/or the second interference pattern; extracting a wrapped phase of the at least a portion of the object based on the at least one first image and the at least one second image; unwrapping the wrapped phase of the at least a portion of the object to generate an unwrapped phase; identifying a computed depth map distance from a fixed point to the at least a portion of the object based on the unwrapped phase; and fitting an ideal part to the computed depth map of the at least a portion of an object to measure the surface characteristics. As used herein, "based on" may mean "utilizing data derived from." In certain embodiments, there method steps may be performed in the order recited, or the order may be varied as desired, as long as the method remains capable of obtaining the desired result.

According to certain embodiments, providing at least one light source may include providing a source of monochromatic light. The source of monochromatic light may be a laser. The laser may be a multi-line laser. According to certain embodiments, the laser may project monochromatic light from about 390 nm in wavelength to about 700 nm in wavelength. According to some embodiments, the light source may project light from about 420 nm in wavelength to about 480 nm in wavelength. According to some embodiments, the light source may project light at about 450 nm in wavelength. The at least one light source may be positioned in such a way so as to project an interference pattern of adjustable phase over a volume containing the at least a portion of the object.

According to certain embodiments, directing light from the light source to generate a first interference pattern on the at least a portion of the object may include directing light from the at least one light source through a grating, mask, or combining the light with a reference beam in order to generate a first interference pattern over a volume containing the at least a portion of the object. The at least a portion of the object may overlap at least two diffraction orders of the first interference pattern. According to certain embodiments, different wavelengths and polarization may be utilized in generating the first interference pattern.

The at least a portion of the object may be at least partially submerged in a liquid medium, optionally wherein the liquid medium comprises water. The at least a portion of the object may be substantially cylindrical, substantially spherical, substantially a rectangular cuboid, or flat on at least one surface. According to certain embodiments, the quantitative measurement of surface characteristics in optically distorting media may include at least one of: determining a thickness change of at least a portion of an object; determining the porosity of at least a portion of an object; determining the composition of at least a portion of an object; or combinations thereof. According to certain embodiments, the object may be a nuclear fuel rod or steam generator tube or conduit.

According to certain embodiments, the method may include the feature that the grating and the object define a distance d therebetween, wherein d is at least a minimum distance required for safety considerations involving nuclear fuel. The distance "d" may vary, depending on the time of exposure required, the safe distance required for personnel actually handling the materials, and/or the amount of shielding available and used. Safe exposure levels are known to those of skill in the art, and are defined in, for example, "EU Directive 2013/59/Euratom-protection against ionising radiation," in the European Union and 10 C.F.R. § 20.1201 (for adults generally), 10 C.F.R. § 20.1207 (for minors generally), and 10 C.F.R § 20.1208 (for pregnant women) in the United States. Further, safe distances for maintenance of the equipment used may be considered, in order to protect against damage and failure of the materials. To this end, different shieldings, mirrors, and exposure times may be varied to keep exposure of the equipment to ionizing radiation to acceptable levels.

According to certain embodiments, capturing at least one first image of the first interference pattern may include gathering light from the at least a portion of an object with a telecentric lens, and directing it to an imaging sensor. According to certain embodiments, the capturing of the at least one first image may include taking a photograph. The capturing of the at least one first image may include gathering video data. In particular embodiments, the capturing at least one first image may utilize a filter configured to substantially block ambient light. According to certain embodiments, the telecentric lens may have at least one of a working distance range of about 103 mm, a broadband anti-reflection coating of about 425 nm to about 675 nm, anodized aluminum construction, a field of view from about 12 mm to about 16 mm, and/or distortion of less than 0.20% at 588 nm. According to certain embodiments, the imagining sensor may comprise at least one camera. In particular embodiments, the at least one camera may be one more or monochrome cameras with at least one of 8-bit pixel depth, progressive scan CMOS, about 2.2 micrometer by about 2.2 micrometer pixel size, about 5.6 mm by about 4.2 mm sensing area, and/or comprise an imaging device with a maximum signal to noise ratio of at least about 20 dB. According to some embodiments, the camera may include an imaging device with a maximum signal to noise ratio of at least about 35 dB. According to further embodiments, the camera may include an imaging device with a maximum signal to noise ratio of about 38.1 dB.

According to certain embodiments, capturing at least one first image comprises low-coherence scanning or canoscopic scanning.

According to certain embodiments, capturing at least one second image of the second interference pattern includes generating a second interference pattern. This may be done by, for example, using a worm stepper configured to move a grating in order to alter the phase of the first interference pattern. Other structured light can be projected, such as objective speckle or a fringe composed of incoherent light. Other means of establishing interference may be used, such as combining with a reference beam or viewing through a mask. According to certain embodiments, different wavelengths and polarization may be utilized. Capturing the at least one second image may include utilizing a telecentric lens and directing the image to an imaging sensor. Capturing of the at least one second image may include taking a photograph. The capturing of the at least one second image may include gathering video data. In particular embodiments, the capturing at least one second image may utilize a filter configured to substantially block ambient light. According to certain embodiments, the telecentric lens may have at least one of a working distance range of about 103 mm, a broadband anti-reflection coating of about 425 nm to about 675 nm, anodized aluminum construction, a field of view from about 12 mm to about 16 mm, and/or distortion of less than 0.20% at 588 nm. According to certain embodiments, the imagining sensor may comprise at least one camera. In particular, the at least one camera may be one more or monochrome cameras with at least one of 8-bit pixel depth, progressive scan CMOS, about 2.2 micrometer by about 2.2 micrometer pixel size, about 5.6 mm by about 4.2 mm sensing area, and/or comprise an imaging device with a maximum signal to noise ratio of at least about 20 dB. According to some embodiments, the at least one camera may include an imaging device with a maximum signal to noise ratio of at least about 35 dB. According to further embodiments, the at least one camera may include an imaging device with a maximum signal to noise ratio of about 38.1 dB.

According to certain embodiments, capturing at least one second image comprises low-coherence scanning or canoscopic scanning.

According to certain embodiments, filtering distortion from the first and/or second interference pattern(s) includes removing misleading data from the first image and/or second image due to differences in index of refraction, movement of objects, and/or changes in flow, wherein the changes in flow may be the result of natural convection. Flow and movement due to flow may result in local changes of temperature in a medium, including, for example and without limitation, a spent fuel pool for storing of nuclear fuel rods, wherein the rods are stored at approximately 2 atmospheres (atm), approximately 10 meters underwater, at a bulk temperature ranging from about 25° C. to about 30° C. for the pool as a whole, but with temperatures being much warmer nearer the fuel rods. According to certain embodiments, filtering distortion comprises resolving differences in the index of refraction in a medium between the grating and the object. The differences in the index of refraction in a medium between the grating and object may comprise the result of local changes of temperature in the medium. According to certain embodiments, the first and/or second image may be approximated as a tensor, and the tensor may include components of pixel height, pixel width, and frame count which describe position and time, and optionally terms corresponding to quadratic and/or linear loss functions. According to certain embodiments, filtering distortion comprises factoring an image tensor into a low rank subspace plus a sparse tensor and utilizing a loss function, wherein the loss function includes a quadratic term for the low rank subspace and at least one term for the sparse component. The low rank subspace may include information relating to how a given phase correlates to a projected interference pattern. The low rank subspace may include information relating to changes over time due to relative movement of the object.

According to certain embodiments, filtering distortion from the first and/or second interference pattern(s) includes tensor decomposition. The first and/or second image may be approximated as a tensor, and the tensor may be decomposed into three additive components, the sum of which is the original tensor: a low rank subspace, a sparse component, and an error component. The low rank subspace portion may be determined by bilateral random projection, which reduces the absolute value of the original tensor minus the low rank subspace and sparse component to a minimum value, and assumes this minimum to be noise. This may be done by solving two problems in alternating fashion: solving for the low-rank subspace using an initial (or previously solved-for) sparse component, and solving for the sparse component using an initial (or previously solved-for) low-rank subspace, wherein the rank of the low rank subspace and cardinality of the sparse component are constrained. This is described in, for example, Zhou, et al, "GoDec: Randomized Low-rank & Sparse Matrix Decomposition in Noisy Case," 2011 International Conference on Machine Learning.

The following example is set forth merely to further illustrate the subject method. The illustrative example should not be construed as limiting the subject matter in any manner.

According to some embodiments, filtering distortion may include approximating the first and/or second images as a time/space point cloud, analyzing the point cloud, and eliminating those portions determined to have a signal to noise ratio below a given threshold. Distortion may be managed by factoring the images tensor into a low rank subspace plus a sparse tensor using a loss function composed of a quadratic term for a low rank subspace and an $L_1$ term for the sparse component. The low rank subspace incorporates the information of how the given phase relates to projected fringe phase, including changes over time due to movement of the at least a portion of an object.

According to certain embodiments, an object of fixed position may be provided within the first and second images in order to provide reference data concerning diffraction orders of the first and/or second interference patterns in order to aid in filtering distortion.

According to certain embodiments, extracting a wrapped phase of the at least a portion of the object based on the at least one first image and at least one second image may include determining the phase of the diffraction pattern at a given pixel of the image captured in the first and second images.

According to certain embodiments, unwrapping the wrapped phase of the at least a portion of the object to generate an unwrapped phase may include utilizing knowledge of the fringe geometry to uniquely identify a depth map of distance to the at least a portion of an object at each pixel. According to certain embodiments, this may be done by windowed Fourier analysis, wherein the windowed Fourier analysis includes extracting spatial information by confining analysis within a defined window, where the window can be of any shape, and fitting this spatial information to a given geometry.

According to certain embodiments, identifying a computed depth map distance to the at least a portion of the object based on the unwrapped phase includes comparing the unwrapped phase with an ideal object. According to certain embodiments, the ideal object may be substantially cylindrical, and identifying a computed depth map may comprise at least one of identifying an average radius of at least a portion of the object, or identifying a surface mapping comprising distances to a model object center.

Provided as an example and without limitation, if the object is a nuclear fuel rod, the ideal surface is a cylinder, and one output is an average radius that can be compared to original specifications; another output is a map over the surface showing distance to the ideal rod center. The displacement mapping may also be statistically analyzed to determine surface roughness or other characteristics.

According to certain embodiments, the method includes fitting an ideal part to the computed depth map of the at least a portion of the object to measure the surface characteristics. According to certain embodiments, this may be done by minimizing a quadratic loss function or quadric fitting. According to certain embodiments, this may include determining the extent of surface roughness and/or the existence of chimneys by identifying local peaks and troughs in the surface characteristics of the object.

According to certain embodiments, fitting to an ideal part may include fitting an abstract, pre-determined shape of arbitrary position, orientation, and radius to the observed data. This may be done by numerical optimization, wherein the numerical optimization may include a least squares fit of the ideal part to the observed data. According to certain embodiments, fitting to an ideal part may enable self-calibration of a system to the orientation and position of the target.

According to certain embodiments, the method includes comparing the computed depth map to at least one of a model depth map or a previously computed depth map of the at least a portion of the object to determine the surface characteristics, which may include determining a thickness change of the at least a portion of the object.

The method may include, in order, providing at least one light source, directing light from the light source through a grating and onto the object to generate a first interference pattern on the at least a portion of the object, capturing at least one first image of the first interference pattern, shifting the phase of the at least one light source to generate a second interference pattern, capturing at least one second image of the second interference pattern, filtering distortion from the first interference pattern and/or the second interference pattern, extracting a wrapped phase of the at least a portion of the object based on the at least one first image and the at least one second image, unwrapping the wrapped phase of the at least a portion of the object, identifying a computed depth map distance to the at least a portion of the object based on the wrapped phase, and fitting an ideal part to the computed depth map of the at least a portion of the object to measure the surface characteristics.

Figure 1:
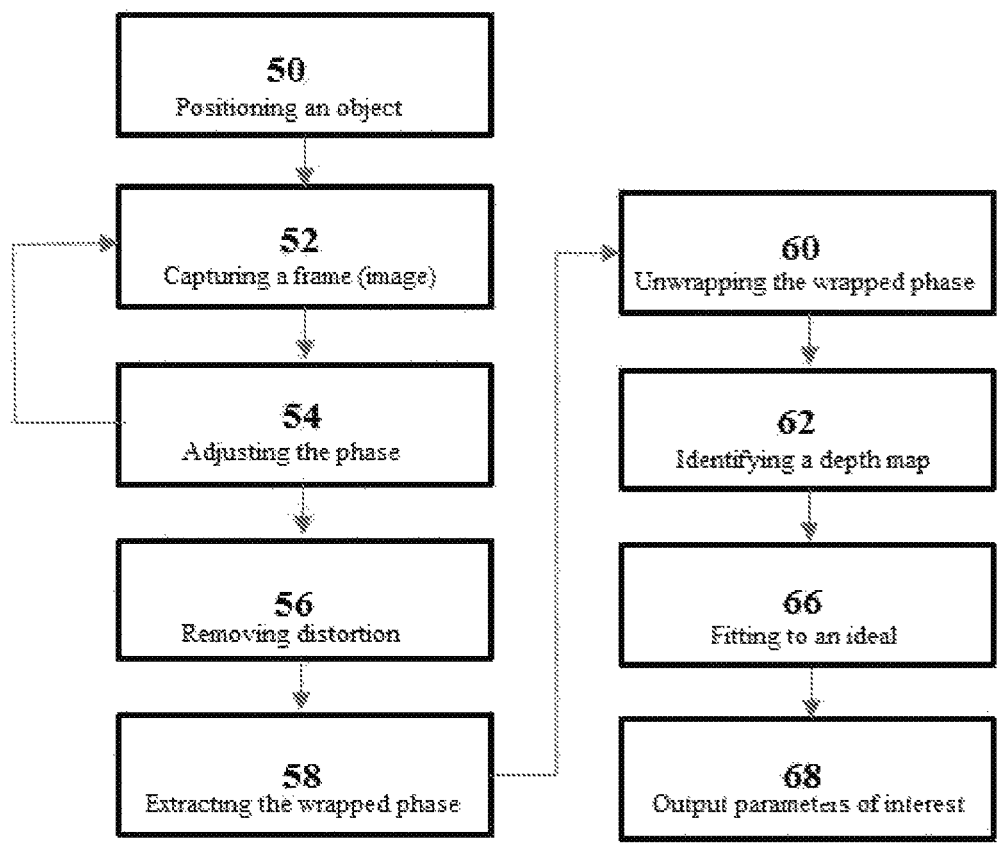
FIG. 1 is a flow chart of an illustrative embodiment of the present subject matter.

FIG. 1 is a flow chart of an illustrative embodiment of the present subject matter. First, the target is positioned 50. According to certain illustrative embodiments, the target may be a nuclear fuel rod positioned 50 underwater within at least two diffraction orders provided by a light source and grating. Next, a frame (image), is captured 52. According to certain illustrative embodiments the frame may be a photograph. According to some illustrative embodiments, the frame may be a video. Next, the projected phase is adjusted 54 to generate a second interference pattern. According to certain illustrative embodiments, this may be done with a worm stepper configured to move a diffraction grating slightly, thereby altering the light infringement pattern wherein the object is positioned 50. After adjusting the phase 54, either another frame is captured 52 with the adjusted phase or distortion is removed 56. According to certain illustrative embodiments, distortion is removed 56 by eliminating changes in the index of refraction caused by thermal differences and flow of water. According to certain illustrative embodiments, the captured frame 52 may be approximated as a tensor including components of pixel height, pixel width, and frame count which describe position and time, and optionally quadratic and/or linear loss functions. After distortion is removed 56, the wrapped phase is extracted 58. According to certain embodiments, the wrapped phase may comprise or consist of the phase of the diffraction pattern at a given pixel of the frame (image) captured 52.

After the wrapped phase is extracted 58, the unwrapped phase is extracted 60 from the wrapped phase. According to certain illustrative embodiments, unwrapping combines the wrapped phase with knowledge of the fringe geometry to uniquely identify 62 a depth map of distance to the target at each pixel. After the computed depth map is identified 62 based on unwrapping 60 the extracted wrapped phase 58, an ideal part is fit to the computed depth map 66. According to certain illustrative embodiments, the ideal part includes a description of the part without defects. According to certain illustrative embodiments, fitting an ideal part to the computed depth map 66 may be by minimizing a quadratic loss function or by quadric fitting. After fitting an ideal part to the computed depth map 66, parameters of interest may be output 68. According to certain illustrative embodiments, the parameters of interest may include a thickness change of at least a portion of an object, such as a nuclear fuel rod. According to certain illustrative embodiments, the thickness change may demonstrate roughness, the general buildup of crud and/or metallic oxides, the existence of chimneys, or the surface of a fuel rod after cleaning.

Figure 2:
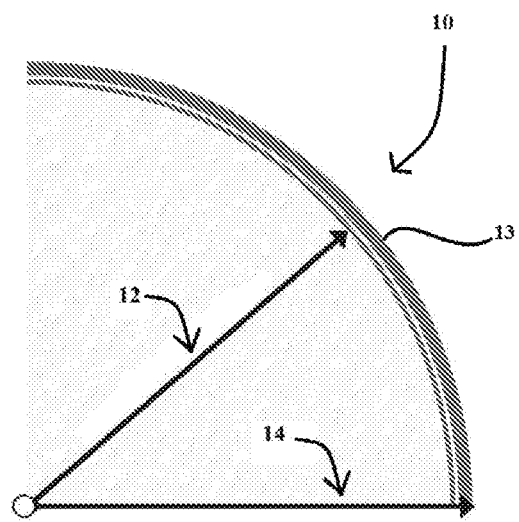
FIG. 2 is a schematic, cross-sectional view showing that deposition of crud on an object changes thickness of the object.

FIG. 2 is a schematic, cross-sectional view showing that deposition of crud on an object changes thickness of the object. At least a portion of an object 10, which may be a nuclear fuel rod or steam generator tube, is shown with an original thickness 12 and a measured thickness 14 with a buildup of crud and/or metallic oxides 13. The measured thickness 14 of the at least a portion of the object 10 with the buildup of crud and/or metallic oxides 13 demonstrates a thickness change from the original thickness 12.

Figure 3:
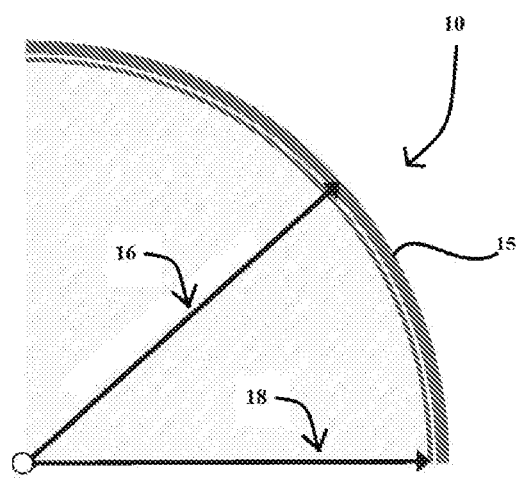
FIG. 3 is schematic, cross-sectional view showing that removal of crud from an object changes thickness of the object.

FIG. 3 is schematic, cross-sectional view showing that removal of crud from an object changes thickness of the object. At least a portion of an object 10 is shown with an in-use thickness 16 of crud and/or metallic oxides 15. Also shown is a cleaned thickness 18 of the at least a portion of an object 10 without crud and/or metallic oxides 15. The method of the present embodiments may be used to detect a thickness change after cleaning of a nuclear fuel rod, showing the resulting difference after the at least a portion of an object 10 has an in-use thickness 16 that has been altered from including a layer of crud and/or metallic oxides 15 to a cleaned thickness 18 without crud and/or metallic oxides 15.

FIG. 4 schematic, cross-sectional view showing that deposition of crud on an object changes thickness of the object that may result in roughness. Shown is at least a portion of an object 10 with a layer of crud and/or metallic oxides 17. As the deposition of crud and/or metallic oxides 17 is not uniform on the at least a portion of an object 10, there are relative peaks 24 and troughs 20. The method of the present embodiments may be used to detect thickness changes of at least a portion of an object 10 wherein there is a relative peak thickness 24 and relative trough thickness 20 in order to evaluate the roughness of the buildup of crud and/or metallic oxides 17 on at least a portion of an object 10.

FIG. 5 schematic, cross-sectional view showing that deposition of crud on an object changes thickness of the object and may reveal defects. Shown is at least a portion of an object with a layer of crud and/or metallic oxides 19. While there may be a substantially uniform thickness 26 of the at least a portion of an object 10 with crud and/or metallic oxides 19, localized portions may show little to no buildup of crud and/or metallic oxides, revealing a local defect thickness 22.

FIG. 6 is a top view of an illustrative embodiment of the present subject matter. A target 38, which includes at least a portion of an object, is positioned within at least two diffraction orders 36. The diffraction orders 36 are generated by light from a light source 30 passing through a grating 32. An image, for example a photograph or video, is captured of the diffraction orders 36 on the target 38 by at least one camera 42 with a filter 44. After at least one first image is captured, the phase is adjusted with a worm stepper 34, which is configured to move the grating 32. After the phase is adjusted, an image, for example a photograph or video, is captured of the diffraction orders 36 of the adjusted phase on the target 38 by the at least one camera 42 with a filter 44. The worm stepper 34 and camera 44 are both controlled with the use of a computer 40.

FIG. 7 is a graph showing the computed radius vs. nominal radius for ten pins measured according to an embodiment. Ten different substantially cylindrical pins, each with a nominal radius ranging from 4750 µm to 4800 µm were measured according to the method described herein. Each pin was measured 5 times, at a distance ranging from 1 cm to 5 cm away from a 60 W heater, which was off. For all fifty measurements, the computed, output radius was within 5% of the nominal radius. The standard error for these measurements was computed to be ±5.81 µm, which is within 0.125% of the nominal radii of the pins. A regression line 50 showing a linear best fit of the data, along with an upper standard error line 52 and lower standard error line 54 are shown.

The following example is set forth merely to further illustrate the present subject matter. The illustrative examples should not be construed as limiting the subject matter in any manner.

EXAMPLE 1

Ten substantially cylindrical pins having a nominal radius ranging from 4750 µm to 4800 µm were measured using the method described herein. Each pin was submerged in water at a predetermined distance ranging from 1-5 cm above a 60 W heater. For each pin and at each distance, one measurement was output with the heater on, so as to induce turbulence and fluctuations in local indexes of refraction, and one measurement was output with the heater off. If the output measurement was outside of 5% of the nominal radius, the output was considered a failure. The results are shown below in Table 1.

TABLE 1

| Cartridge Heater Power (watts) | Distance above heater (cm) | Failure rate (>±5% nominal) | Residual Standard Error (µm) |
|---|---|---|---|
| 60 (heater on) | 1 | 10/10 | n/a |
|  | 2 | 6/10 | 82.99 |
|  | 3 | 0/10 | 41.43 |
|  | 4 | 0/10 | 15.90 |
|  | 5 | 0/10 | 15.25 |
| 0 (heater off) | 1-5 | 0/50 | 5.81 |

As shown in Table 1, all output measurements were considered a failure with the heater on at a distance of 1 cm above the heater. However, at a distance of at least 3 cm away from the heater, all test measurements were successful, with the residual standard error being 41.43 µm at 3 cm with the heater on, which is less than 1% of the nominal radius. At a distance of at least 4 cm, the residual standard error dropped to 15.90 µm, which is less than 0.335% of the nominal radius. With the heater off, all tests were successful, the residual standard error was 5.81 µm, which is less than 0.125% of the nominal radius of the pins. Therefore, the method has been shown to measure the radius of a substantially cylindrical object with less than 1% error, less than 0.335% error in turbulence, and less than 0.125% error without turbulence.

In a first embodiment, provided is a method for measuring surface characteristics of at least a portion of an object, comprising: providing at least one light source; directing light from the at least one light source to generate a first interference pattern on the at least a portion of the object; capturing at least one first image of the first interference pattern; shifting the phase of the at least one light source to generate a second interference pattern; capturing at least one second image of the second interference pattern; filtering distortion from the first interference pattern and/or the second interference pattern; extracting a wrapped phase of the at least a portion of the object based on the at least one first image and the at least one second image; unwrapping the wrapped phase of the at least a portion of the object to generate an unwrapped phase; identifying a computed depth map distance to the at least a portion of the object based on the unwrapped phase; and fitting an ideal part to the computed depth map of the at least a portion of the object to measure the surface characteristics.

The method of the first embodiment may further provide that the first interference pattern and/or second interference pattern is generated by directing the light through a grating, viewing light from the at least one light source through a mask, or combining the light with a reference beam.

The method of the first or any subsequent embodiments may further provide that said method comprises, in order providing at least one light source; directing light from the light source through a grating and onto the object to generate a first interference pattern on the at least a portion of the object; capturing at least one first image of the first interference pattern; shifting the phase of the at least one light source to generate a second interference pattern; capturing at least one second image of the second interference pattern; filtering distortion from the first interference pattern and/or a second interference pattern; extracting a wrapped phase of the at least a portion of the object based on the at least one first image and the at least one second image; unwrapping the wrapped phase of the at least a portion of the object; identifying a computed depth map distance to the at least a portion of the object based on the wrapped phase; and fitting an ideal part to the computed depth map of the at least a portion of the object to measure the surface characteristics.

The method of the first or any subsequent embodiments may further include comparing the computed depth map to at least one of a model depth map or a previously computed depth map of the at least a portion of the object to determine the surface characteristics, which may include determining a thickness change of the at least a portion of the object.

The method of the first or any subsequent embodiment may further provide that the object is at least partially submerged in a liquid medium, optionally wherein the liquid medium comprises water.

The method of the first or any subsequent embodiment may further provide that the object is substantially cylindrical, substantially spherical, or substantially flat on at least one surface, and wherein said measuring surface characteristics includes determining a thickness change of at least a portion of an object.

The method of the first or any subsequent embodiment may further provide that the object is substantially cylindrical.

The method of the first or any subsequent embodiment may further provide that the object is at least one nuclear fuel rod or steam generator tube or conduit.

The method of the first or any subsequent embodiment may further provide that the at least one light source is a laser, optionally a multi-line laser, and said directing light comprises projecting a laser fringe of adjustable phase through a volume containing the object.

The method of the first or any subsequent embodiment may further provide that the grating and the object define a distance d therebetween, wherein d is at least a minimum distance required for safety considerations involving nuclear fuel.

The method of the first or any subsequent embodiment may further provide that said capturing the at least one first image of the first interference pattern and/or the at least one second image of the second interference pattern comprises gathering light from the at least a portion of an object with a telecentric lens and directing it to an imaging sensor.

The method of the first or any subsequent embodiment may further include at least one of the following: (a) said capturing the at least one first image of the first interference pattern and/or the at least one second image of the second interference pattern utilizes a filter configured to substantially block ambient light; and/or (b) the first interference pattern and/or the second interference pattern comprises at least two diffraction orders, wherein the object is positioned within an overlap of said at least two diffraction orders.

The method of the first or any subsequent embodiment may further provide that said filtering distortion comprises factoring an image tensor into a low rank subspace plus a sparse tensor and utilizing a loss function, wherein the loss function includes a quadratic term for the low rank subspace and at least one term for the sparse component.

The method of the first or any subsequent embodiment may further provide that the low rank subspace includes information relating to how a given phase correlates to a projected interference pattern, wherein the low rank substance includes information relating to changes over time due to relative movement of the object.

The method of the first or any subsequent embodiment may further include at least one of the following: (a) said filtering distortion comprises resolving differences in the index of refraction in a medium between the grating and the object and said differences comprise the result of local changes of temperature in the medium; (b) said unwrapping comprises windowed Fourier analysis; (c) said fitting an ideal part comprises at least one of minimizing a quadratic loss function or quadric fitting; and/or (d) said fitting an ideal part comprises determining at least one of surface roughness or the existence of chimneys.

The method of the first or any subsequent embodiment may further include at least one of the following: (a) said capturing at least one first image and/or capturing at least one second image comprises low-coherence scanning or canoscopic scanning, and wherein said filtering distortion comprises analyzing a time/space point cloud; and/or (b) identifying a computed depth map comprises at least one of identifying an average radius of at least a portion of the object or identifying a surface mapping comprising distances to a model object center.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

What is claimed is:

1. A method for measuring surface characteristics of at least a portion of an object, comprising:
    providing at least one light source;
    directing light from the at least one light source to generate a first interference pattern on the at least a portion of the object;
    capturing at least one first image of the first interference pattern;
    shifting the phase of the at least one light source to generate a second interference pattern;
    capturing at least one second image of the second interference pattern;
    filtering distortion from the first interference pattern and/or the second interference pattern;
    extracting a wrapped phase of the at least a portion of the object based on the at least one first image and the at least one second image;
    unwrapping the wrapped phase of the at least a portion of the object to generate an unwrapped phase;
    identifying a computed depth map distance to the at least a portion of the object based on the unwrapped phase; and
    fitting an ideal part to the computed depth map of the at least a portion of the object to measure the surface characteristics;
    wherein the object is substantially cylindrical, substantially spherical, or substantially flat on at least one surface, and wherein said measuring surface characteristics includes determining a deviation of a surface characteristic of at least a portion of an object from an ideal surface.

2. The method of claim 1, wherein the first interference pattern and/or second interference pattern is generated by directing the light through a grating, viewing light from the at least one light source through a mask, or combining the light with a reference beam.

3. The method of claim 2, wherein said method comprises, in order:
    providing at least one light source;
    directing light from the light source through a grating and onto the object to generate a first interference pattern on the at least a portion of the object;
    capturing at least one first image of the first interference pattern;
    shifting the phase of the at least one light source to generate a second interference pattern;
    capturing at least one second image of the second interference pattern;
    filtering distortion from the first interference pattern and/or the second interference pattern;
    extracting a wrapped phase of the at least a portion of the object based on the at least one first image and the at least one second image;
    unwrapping the wrapped phase of the at least a portion of the object;
    identifying a computed depth map distance to the at least a portion of the object based on the wrapped phase; and
    fitting an ideal part to the computed depth map of the at least a portion of the object to measure the surface characteristics.

4. The method of claim 1, wherein the object is at least partially submerged in a liquid medium, optionally wherein the liquid medium comprises water.

5. The method of claim 1, wherein said determining a deviation of a surface characteristic of at least a portion of an object from an ideal surface comprises determining a thickness change of at least a portion of an object.

6. The method of claim 5, wherein the object is substantially cylindrical.

7. The method of claim 6, wherein the object is at least one nuclear fuel rod or steam generator tube or conduit.

8. The method of claim 7, wherein the at least one light source is a laser, optionally a multi-line laser, and said directing light comprises projecting a laser fringe of adjustable phase through a volume containing the object.

9. The method of claim 3, wherein the grating and the object define a distance d therebetween, wherein d is at least a minimum distance required for safety considerations involving nuclear fuel.

10. The method of claim 1, wherein said capturing the at least one first image of the first interference pattern and/or the at least one second image of the second interference pattern comprises gathering light from the at least a portion of an object with a telecentric lens and directing the image to an imaging sensor.

11. The method of claim 3, wherein the object is at least partially submerged in a liquid medium, optionally wherein the liquid medium comprises water.

12. The method of claim 11, wherein the object is substantially cylindrical, and wherein said measuring surface characteristics includes determining a thickness change of at least a portion of an object.

13. The method of claim 12, wherein the object is at least one nuclear fuel rod or steam generator tube or conduit.

14. The method of claim 8, wherein the grating and the object define a distance d therebetween, wherein d is at least a minimum distance required for safety considerations involving nuclear fuel.

15. A method for measuring surface characteristics of at least a portion of an object comprising:
providing at least one light source;
directing light from the at least one light source to generate a first interference pattern on the at least a portion of the object;
capturing at least one first image of the first interference pattern;
shifting the phase of the at least one light source to generate a second interference pattern;
capturing at least one second image of the second interference pattern; wherein
(a) said capturing the at least one first image of the first interference pattern and/or the at least one second image of the second interference pattern utilizes a filter configured to substantially block ambient light; and/or
(b) the first interference pattern and/or the second interference pattern comprises at least two diffraction orders, wherein the object is positioned within an overlap of said at least two diffraction orders;
filtering distortion from the first interference pattern and/or the second interference pattern;
extracting a wrapped phase of the at least a portion of the object based on the at least one first image and the at least one second image;
unwrapping the wrapped phase of the at least a portion of the object to generate an unwrapped phase;
identifying a computed depth map distance to the at least a portion of the object based on the unwrapped phase; and
fitting an ideal part to the computed depth map of the at least a portion of the object to measure the surface characteristics.

16. A method for measuring surface characteristics of at least a portion of an object, comprising:
providing at least one light source;
directing light from the at least one light source to generate a first interference pattern on the at least a portion of the object;
capturing at least one first image of the first interference pattern;
shifting the phase of the at least one light source to generate a second interference pattern;
capturing at least one second image of the second interference pattern;
filtering distortion from the first interference pattern and/or the second interference pattern, wherein said filtering distortion comprises factoring an image tensor into a low rank subspace plus a sparse tensor and utilizing a loss function, wherein the loss function includes a quadratic term for the low rank subspace and at least one term for the sparse component;
extracting a wrapped phase of the at least a portion of the object based on the at least one first image and the at least one second image;
unwrapping the wrapped phase of the at least a portion of the object to generate an unwrapped phase;
identifying a computed depth map distance to the at least a portion of the object based on the unwrapped phase; and
fitting an ideal part to the computed depth map of the at least a portion of the object to measure the surface characteristics.

17. The method of claim 16, wherein the low rank subspace includes information relating to how a given phase correlates to a projected interference pattern, wherein the low rank substance includes information relating to changes over time due to relative movement of the object.

18. A method for measuring surface characteristics of at least a portion of an object, comprising:
providing at least one light source;
directing light from the at least one light source to generate a first interference pattern on the at least a portion of the object;
capturing at least one first image of the first interference pattern;
shifting the phase of the at least one light source to generate a second interference pattern;
capturing at least one second image of the second interference pattern;
filtering distortion from the first interference pattern and/or the second interference pattern;
extracting a wrapped phase of the at least a portion of the object based on the at least one first image and the at least one second image;
unwrapping the wrapped phase of the at least a portion of the object to generate an unwrapped phase;
identifying a computed depth map distance to the at least a portion of the object based on the unwrapped phase; and
fitting an ideal part to the computed depth map of the at least a portion of the object to measure the surface characteristics, and comprising at least one of the following:
(a) said filtering distortion comprises resolving differences in the index of refraction in a medium between the grating and the object and said differences comprise the result of local changes of temperature in the medium;
(b) said unwrapping comprises windowed Fourier analysis;
(c) said fitting an ideal part comprises at least one of minimizing a quadratic loss function or quadric fitting; and/or
(d) said fitting an ideal part comprises determining at least one of surface roughness or the existence of chimneys.

19. A method for measuring surface characteristics of at least a portion of an object, comprising:

providing at least one light source;

directing light from the at least one light source to generate a first interference pattern on the at least a portion of the object;

capturing at least one first image of the first interference pattern;

shifting the phase of the at least one light source to generate a second interference pattern;

capturing at least one second image of the second interference pattern;

filtering distortion from the first interference pattern and/or the second interference pattern;

extracting a wrapped phase of the at least a portion of the object based on the at least one first image and the at least one second image;

unwrapping the wrapped phase of the at least a portion of the object to generate an unwrapped phase;

identifying a computed depth map distance to the at least a portion of the object based on the unwrapped phase; and fitting an ideal part to the computed depth map of the at least a portion of the object to measure the surface characteristics, and comprising at least one of the following:

(a) said capturing at least one first image and/or capturing at least one second image comprises low-coherence scanning or canoscopic scanning, and wherein said filtering distortion comprises analyzing a time/space point cloud; and/or (b) identifying a computed depth map comprises at least one of identifying an average radius of at least a portion of the object or identifying a surface mapping comprising distances to a model object center.

20. A method for measuring surface characteristics of at least a portion of an object, comprising:

providing at least one light source;

directing light from the at least one light source to generate a first interference pattern on the at least a portion of the object;

capturing at least one first image of the first interference pattern;

shifting the phase of the at least one light source to generate a second interference pattern;

capturing at least one second image of the second interference pattern;

filtering distortion from the first interference pattern and/or the second interference pattern;

extracting a wrapped phase of the at least a portion of the object based on the at least one first image and the at least one second image;

unwrapping the wrapped phase of the at least a portion of the object to generate an unwrapped phase;

identifying a computed depth map distance to the at least a portion of the object based on the unwrapped phase; and fitting an ideal part to the computed depth map of the at least a portion of the object to measure the surface characteristics, wherein the first interference pattern and/or second interference pattern is generated by directing the light through a grating, viewing light from the at least one light source through a mask, or combining the light with a reference beam, wherein the object is at least partially submerged in a liquid medium, optionally wherein the liquid medium comprises water, and wherein the object is substantially cylindrical, and wherein said measuring surface characteristics includes determining a thickness change of at least a portion of an object.

21. The method of claim 20, wherein the object is at least one nuclear fuel rod or steam generator tube or conduit.

\* \* \* \* \*